US011929594B1

(12) United States Patent
Gozawa et al.

(10) Patent No.: US 11,929,594 B1
(45) Date of Patent: Mar. 12, 2024

(54) SPARK PLUG

(71) Applicant: Niterra Co., Ltd., Nagoya (JP)

(72) Inventors: Tatsuya Gozawa, Nagoya (JP); Ritsuka Nakagawa, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/265,869

(22) PCT Filed: Oct. 11, 2021

(86) PCT No.: PCT/JP2021/037591
§ 371 (c)(1),
(2) Date: Jun. 7, 2023

(87) PCT Pub. No.: WO2022/168371
PCT Pub. Date: Aug. 11, 2022

(30) Foreign Application Priority Data

Feb. 2, 2021 (JP) ................................ 2021-015131

(51) Int. Cl.

| | |
|---|---|
| ***H01T 13/54*** | (2006.01) |
| ***H01T 13/08*** | (2006.01) |
| ***H01T 13/32*** | (2006.01) |
| ***H01T 13/34*** | (2006.01) |
| ***H01T 13/46*** | (2006.01) |

(52) U.S. Cl.
CPC ............. *H01T 13/32* (2013.01); *H01T 13/08* (2013.01); *H01T 13/34* (2013.01); *H01T 13/467* (2013.01); *H01T 13/54* (2013.01)

(58) Field of Classification Search
CPC ...................................................... H01T 13/54
USPC .......................................................... 313/141
See application file for complete search history.

(56) References Cited

U.S. PATENT DOCUMENTS

2016/0079739 A1 3/2016 Okazaki et al.
2016/0254650 A1* 9/2016 Maul ....................... H01T 13/54 123/169 EL
2020/0185888 A1 6/2020 Niessner (Continued)

FOREIGN PATENT DOCUMENTS

JP 2012-199236 A 10/2012
JP 2016-62664 A 4/2016
JP 2020-149924 A 9/2020

OTHER PUBLICATIONS

International Search Report from corresponding International Patent Application No. PCT/JP21/37591, dated Dec. 21, 2021.

(Continued)

*Primary Examiner* — Christopher M Raabe
(74) *Attorney, Agent, or Firm* — KUSNER & JAFFE

(57) ABSTRACT

The spark plug is provided with: an insulator; a main metal fitting in which a shelf portion for locking the insulator is provided; and a cap joined to the main metal fitting by way of a melted portion. The cap forms an auxiliary chamber, and includes an injection port penetrating from an inner surface to an outer surface. There is a gap extending from the auxiliary chamber to the melted portion, between a first surface connecting an inner peripheral surface of the main metal fitting and an outer peripheral surface of the main metal fitting on a tip end side of the shelf portion, and a second surface of the cap, connecting an inner surface and an outer surface thereof, and the gap includes an opening portion which opens into the auxiliary chamber in a radial direction.

4 Claims, 8 Drawing Sheets

(56) References Cited

U.S. PATENT DOCUMENTS

| | | | | |
|---|---|---|---|---|
| 2021/0359495 | A1* | 11/2021 | Ban | H01T 21/02 |
| 2021/0399532 | A1* | 12/2021 | Ban | H01T 13/54 |

OTHER PUBLICATIONS

International Preliminary Report on Patentability from related/corresponding Japanese PCT Patent Application No. PCT/JP2021/037591, dated Aug. 3, 2023.

* cited by examiner

SPARK PLUG

FIELD OF THE INVENTION

The present invention relates to a spark plug in which a cap forming a sub chamber is joined to a metal shell.

BACKGROUND OF THE INVENTION

A spark plug in which a cap forming a sub chamber is joined via a melt portion to a metal shell which is attached to an engine, has been known from Japanese Patent Application Laid-Open (kokai) No. 2016-62664 (Patent Document 1). In this type of spark plug, fuel gas having flowed from a jet port of the cap into the sub chamber is ignited to generate flame in the sub chamber, a gas flow including the flame is jetted from the jet port to a combustion chamber, and fuel gas in the combustion chamber is combusted by this jet flow.

In the conventional art, the melt portion having a lower thermal conductivity than the cap and the metal shell is exposed on the inner circumferential surface of the metal shell on the front side with respect to a ledge portion, of the metal shell, which engages with a frontward facing surface of an insulator. When the melt portion exposed on the inner circumferential surface of the metal shell is exposed to a high-temperature gas flow including flame, heat may be stored in the melt portion, causing excessive heating of the melt portion. The excessively heated melt portion becomes a source of pre-ignition of fuel gas having flowed into the sub chamber.

SUMMARY OF THE INVENTION

The present invention has been made to solve the above problem, and an object of the present invention is to provide a spark plug that can reduce pre-ignition of fuel gas having flowed into a sub chamber.

In order to attain the above object, a spark plug of the present invention includes: a tubular insulator having a frontward facing surface on an outer circumference thereof, and having an axial hole extending along an axial line; a center electrode disposed in the axial hole of the insulator; a tubular metal shell having, on an inner circumference thereof, a ledge portion engaging with the frontward facing surface of the insulator; a ground electrode electrically connected to the metal shell and providing a spark gap between a front end portion of the center electrode and an end portion thereof; and a cap joined to the metal shell via a melt portion, and the cap covers the front end portion of the center electrode and the end portion of the ground electrode from a front side to form a sub chamber, and has a jet port penetrating from an inner surface to an outer surface thereof. A gap which extends from the sub chamber to the melt portion is present between a first surface which connects an inner circumferential surface of the metal shell on the front side with respect to the ledge portion and an outer circumferential surface of the metal shell and a second surface, of the cap, which connects the inner surface and the outer surface, and the gap has an opening which is open in a radial direction with respect to the sub chamber.

According to a first aspect of the present invention, a gap which extends from the sub chamber to the melt portion is present between the first surface which connects the outer circumferential surface and the inner circumferential surface of the metal shell on the front side with respect to the ledge portion, of the metal shell, which engages with the frontward facing surface of the insulator and the second surface, of the cap, which connects the inner surface and the outer surface. Since the opening of the gap is open in the radial direction with respect to the sub chamber, a swirling flow in the axial line direction (gas flow including flame) generated in the sub chamber is less likely to enter the gap. As a result, gas having a temperature lower than that of the gas flow including the flame (hereinafter, referred to as "low-temperature gas") easily remains in the gap.

When the low-temperature gas remains in the gap, fuel gas having flowed from the jet port into the sub chamber is less likely to come into contact with the melt portion, so that the melt portion is less likely to be cooled by the fuel gas having a temperature lower than that of the low-temperature gas. After the gas flow is jetted from the jet port, a change in the temperature of the melt portion when the fuel gas flows from the jet port into the sub chamber can be reduced, so that cracks that are generated in the melt portion by thermal stress can be reduced.

Furthermore, when the low-temperature gas remains in the gap and the melt portion is less likely to be heated by the gas flow including the flame, excessive heating of the melt portion can be reduced. Accordingly, pre-ignition of the fuel gas having flowed into the sub chamber can be reduced.

According to a second aspect of the present invention, the gap has a first opposing portion which extends from the opening toward an outer side in the radial direction, and a second opposing portion which is connected to the first opposing portion. The second opposing portion extends in a direction different from a direction in which the first opposing portion extends, so that the gas flow in the sub chamber is less likely to reach the melt portion. Excessive heating of the melt portion can be further reduced, so that, in addition to the effects of the first aspect, pre-ignition of the fuel gas having flowed into the sub chamber can be further reduced.

According to a third aspect of the present invention, a shortest distance A in the radial direction between a line (outer line) located on the outer side in the radial direction out of a first line at which the inner circumferential surface of the metal shell and the first surface intersect and a second line at which the inner surface and the second surface of the cap intersect and the outer surface or the outer circumferential surface on the front side with respect to the ledge portion, and a shortest distance B in the radial direction between the outer line and a portion, of the melt portion, which is exposed to the gap have a relationship of $B/A \geq 0.1$. The length in the radial direction from the opening of the gap to the melt portion can be ensured, so that the melt portion is further less likely to be exposed to the gas flow including the flame. In addition, a path from the opening to the melt portion can be lengthened. Therefore, until the gas flow having entered the gap from the opening reaches the melt portion, heat is transmitted from the gas flow to the metal shell and the cap, so that the temperature of the gas flow is decreased and excessive heating of the melt portion can be further reduced. In addition to the effects of the first or second aspect, pre-ignition of the fuel gas having flowed into the sub chamber can be further reduced.

According to a fourth aspect of the present invention, in a cross-section including the axial line, a perpendicular line which is drawn from a midpoint of a line segment connecting edges on the inner surface side of the jet port does not intersect a line segment connecting edges of the opening. The fuel gas having flowed from the jet port into the sub chamber is further less likely to come into contact with the melt portion, so that a change in the temperature of the melt portion can be further reduced. In addition to the effects of any of the first to third aspects, cracks that are generated in the melt portion by thermal stress can be further reduced.

DETAILED DESCRIPTION OF THE INVENTION

Figure 1:
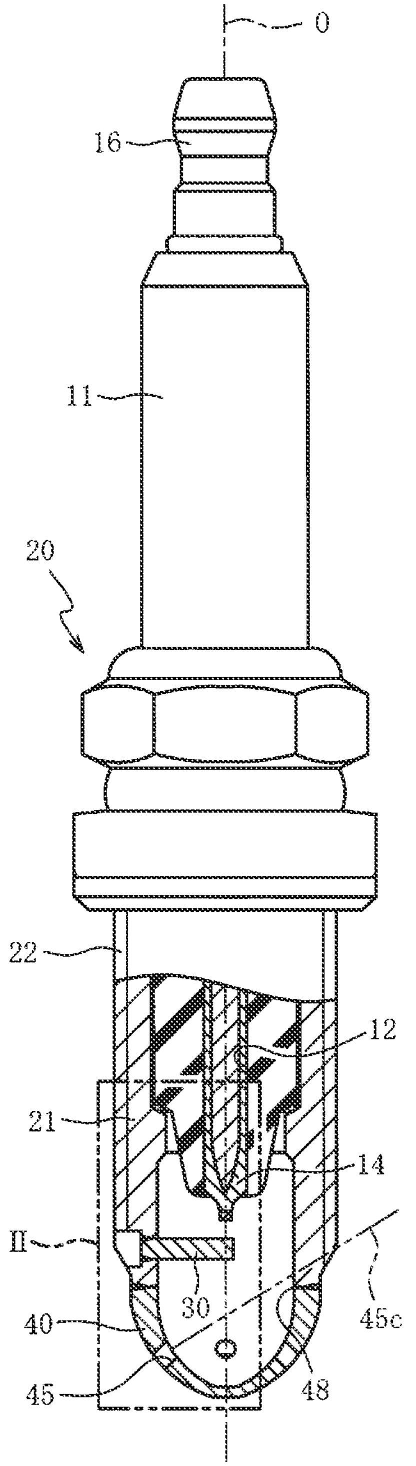
FIG. 1 is a partial cross-sectional view of a spark plug according to a first embodiment.
Figure 2:
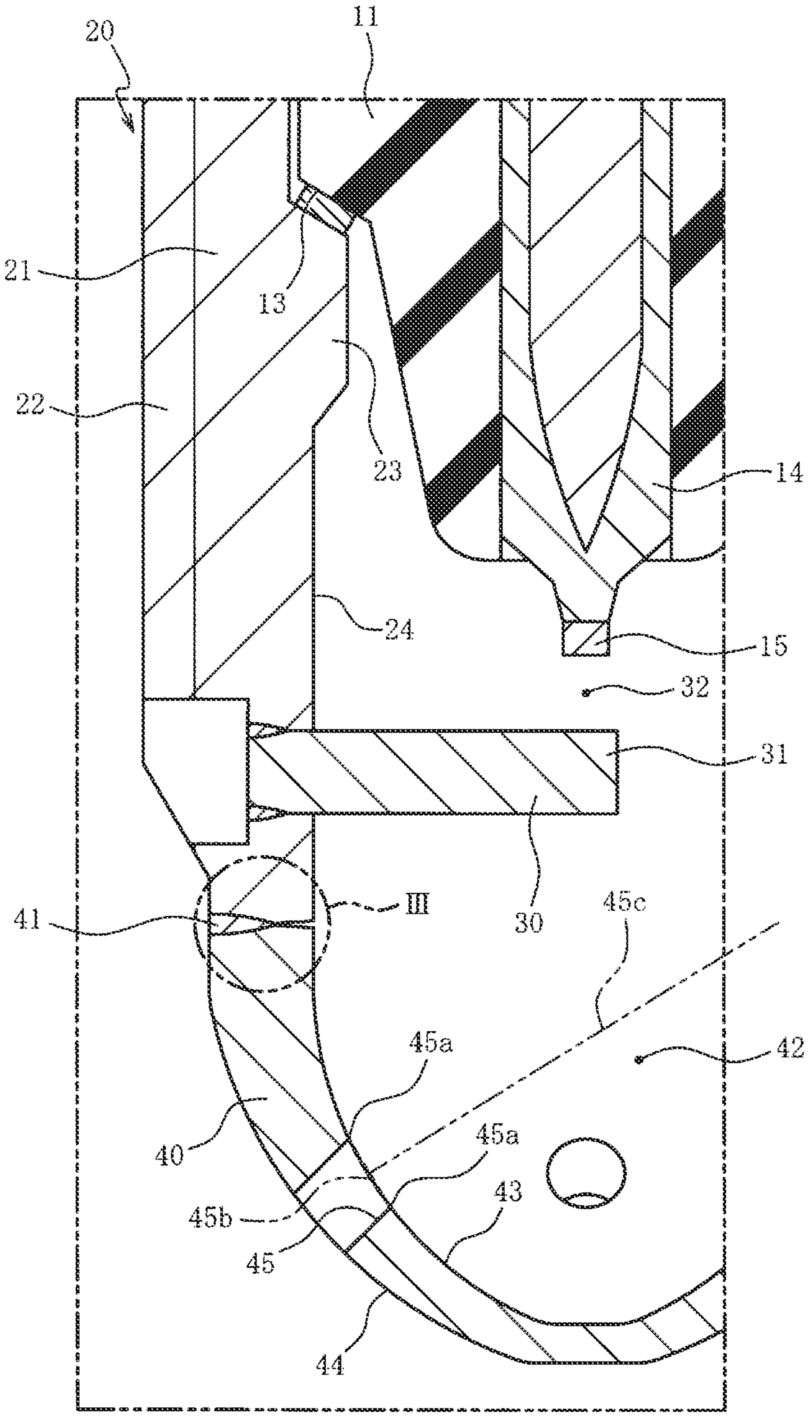
FIG. 2 is an enlarged cross-sectional view of the spark plug at a part indicated by II in FIG. 1.

Hereinafter, preferred embodiments of the present invention will be described with reference to the accompanying drawings. FIG. 1 is a partial cross-sectional view of a spark plug 10 according to a first embodiment. FIG. 1 shows a cross-section, including an axial line O, of a part on a front side of the spark plug 10. FIG. 2 is an enlarged cross-sectional view including the axial line O of the spark plug 10 at a part indicated by II in FIG. 1. In FIG. 1 and FIG. 2, the lower side on the drawing sheet is referred to as a front side of the spark plug 10, and the upper side on the drawing sheet is referred to as a rear side of the spark plug 10 (the same applies to FIG. 3 to FIG. 8). As shown in FIG. 1, the spark plug includes an insulator 11, a center electrode 14, a metal shell 20, a ground electrode 30, and a cap 40.

The insulator 11 is a substantially cylindrical member having an axial hole 12 extending along the axial line O, and is formed from a ceramic such as alumina which has excellent mechanical property and insulation property at high temperature. The insulator 11 has, on the outer circumference thereof, a frontward facing surface 13 (see FIG. 2). In the present embodiment, the frontward facing surface 13 is a conical surface having a diameter that decreases toward the front side, but is not limited thereto. The frontward facing surface 13 may be a surface perpendicular to the axial line O.

The center electrode 14 is disposed on the front side of the axial hole 12 of the insulator 11. A front end portion 15 (see FIG. 2) of the center electrode 14 projects from the insulator 11 to the front side. The center electrode 14 is electrically connected to a metal terminal 16 in the axial hole 12. The metal terminal 16 is a rod-shaped member to which a high-voltage cable (not shown) is connected, and is formed from a conductive metal material (e.g., low-carbon steel, etc.). The metal terminal 16 is fixed to the rear end of the insulator 11.

The metal shell 20 is a substantially cylindrical member formed from a conductive metal material (e.g., low-carbon steel, etc.). The metal shell 20 is disposed on the outer circumference of the insulator 11. The metal shell 20 has an external thread 22 on the outer circumference of a trunk portion 21 thereof. The external thread 22 is fitted into a screw hole (not shown) of an engine. The heat of the trunk portion 21 of the metal shell 20, the ground electrode 30, and the cap 40 moves through the external thread 22 to the engine.

As shown in FIG. 2, the trunk portion 21 has, on the inner circumference thereof, a ledge portion 23 located on the front side of the frontward facing surface 13 of the insulator 11. The ledge portion 23 engages with the frontward facing surface 13 of the insulator 11. In the present embodiment, an inner circumferential surface 24 of the metal shell 20 on the front side with respect to the ledge portion 23 is located on the outer side in the radial direction with respect to the inner circumferential surface of the ledge portion 23. Accordingly, the volume of a space formed on the inner side in the radial direction of the trunk portion 21 can be made larger than that in the case where the inner circumferential surface 24 of the metal shell 20 on the front side with respect to the ledge portion 23 and the inner circumferential surface of the ledge portion 23 are in the same plane.

The ground electrode 30 is joined to the trunk portion 21 of the metal shell 20. The ground electrode 30 is, for example, a rod-shaped member made of a metal containing one or more of Pt, Ni, Ir, etc., as a main component. In the present embodiment, the ground electrode 30 is disposed at the position of the external thread 22 and penetrates the trunk portion 21. An end portion 31 of the ground electrode 30 opposes the front end portion 15 of the center electrode 14. A spark gap 32 is provided between the front end portion 15 of the center electrode 14 and the end portion 31 of the ground electrode 30.

The cap 40 is connected to the trunk portion 21 of the metal shell 20. The cap 40 is a hemispherical member, and is, for example, formed from a metal material containing one or more of Fe, Ni, Cu, etc., as a main component. The cap 40 is joined to the metal shell 20 via a melt portion 41. The melt portion 41 is formed by melting the cap 40 and the metal shell 20.

The cap 40 covers the front end portion 15 of the center electrode 14 and the end portion 31 of the ground electrode 30 from the front side to form a sub chamber 42 surrounded by the trunk portion 21 of the metal shell 20 and the cap 40. The cap 40 has a jet port 45 penetrating from an inner surface 43 to an outer surface 44 of the cap 40. The jet port 45 provides communication between a combustion chamber of the engine (not shown) and the sub chamber 42. A perpendicular line 45*c* which is drawn from the midpoint of a line segment 45*b* connecting edges 45*a*, 45*a* on the inner surface 43 side of the jet port 45 intersects the trunk portion 21 of the metal shell 20 on the rear side with respect to an opening 48 (see FIG. 1, described later).

Figure 3:
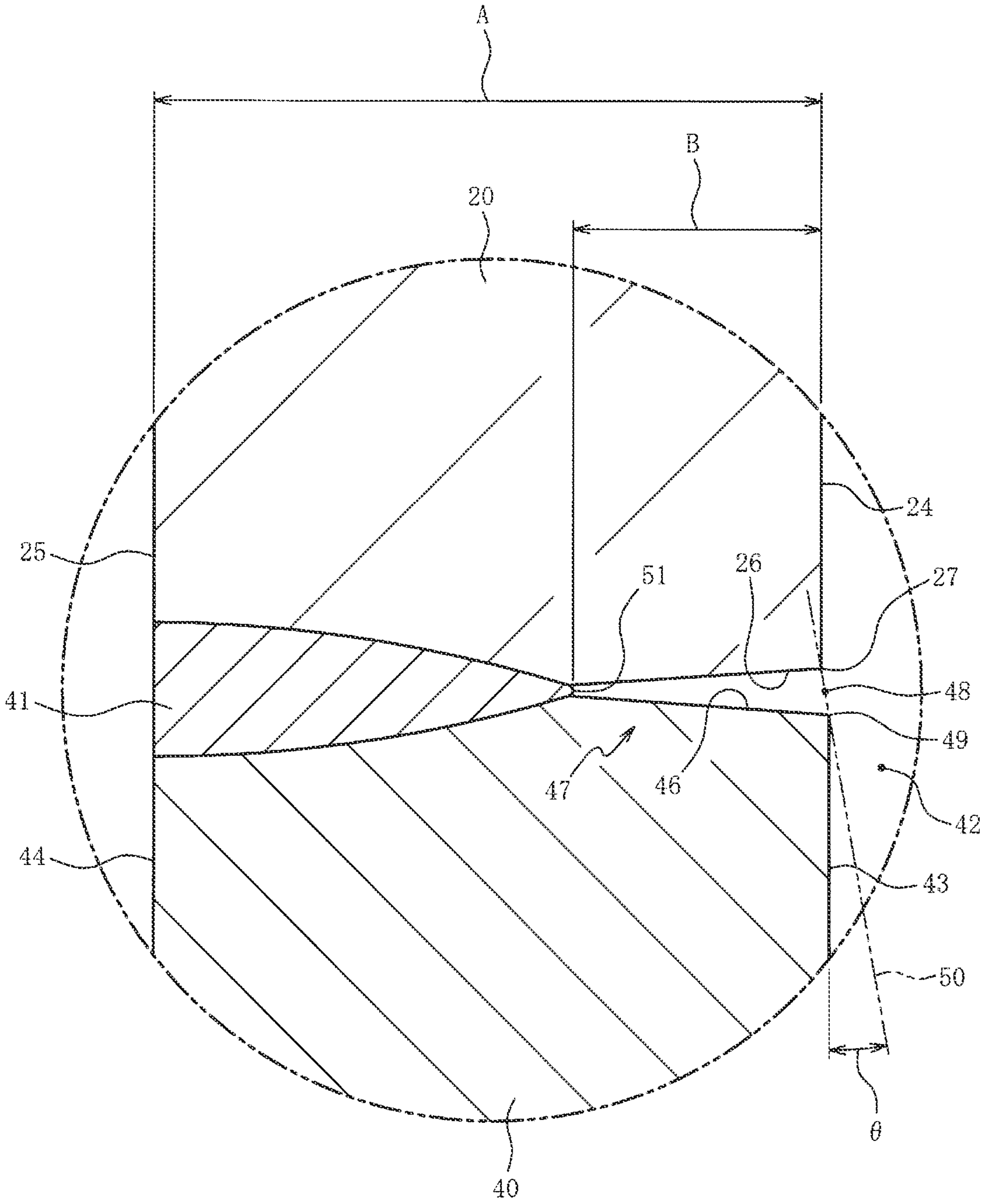
FIG. 3 is a cross-sectional view of the spark plug at a part indicated by III in FIG. 2.

FIG. 3 is an enlarged cross-sectional view, including the axial line O, of the spark plug 10 at a part indicated by III in FIG. 2. The melt portion 41 is continuous over the entire circumference of the metal shell 20 and the cap 40. In the spark plug 10, a gap 47 which extends from the sub chamber 42 to the melt portion 41 is present between: a first surface 26, of the metal shell 20, which connects the inner circumferential surface 24 of the metal shell 20 on the front side with respect to the ledge portion 23 (see FIG. 2) and an outer circumferential surface 25 of the metal shell 20 on the front side with respect to the ledge portion 23; and a second surface 46, of the cap 40, which connects the inner surface 43 and the outer surface 44 of the cap 40.

The gap 47 may exist at a part of the entire circumference of the metal shell 20 and the cap 40, or may exist intermittently over the entire circumference of the metal shell 20 and the cap 40. In the present embodiment, the gap 47 is continuous over the entire circumference of the metal shell 20 and the cap 40. The first surface 26 includes a surface which is in contact with the gap 47, and an interface between the metal shell 20 and the melt portion 41. The second surface 46 includes a surface which is in contact with the gap 47, and an interface between the cap 40 and the melt portion 41.

The gap 47 has the opening 48 which is open in the radial direction with respect to the sub chamber 42. The opening 48 is a portion, of the gap 47, between a first line 27 at which the first surface 26 and the inner circumferential surface 24 intersect and a second line 49 at which the second surface 46 and the inner surface 43 intersect. The first line 27 and the second line 49 indicate edges of the opening 48. The dimension in the circumferential direction (length) of the opening 48 is longer than the dimension in the axial line direction (width) of the opening 48. In the present embodiment, the distance in the axial line direction between the first surface 26 and the second surface 46 gradually shortens from the opening 48 of the gap 47 toward the melt portion 41.

In the spark plug 10 attached to the engine (not shown), fuel gas flows from the combustion chamber of the engine through the jet port 45 into the sub chamber 42 by a valve operation of the engine. The spark plug 10 generates a flame kernel in the spark gap 32 by discharge between the center electrode 14 and the ground electrode 30. When the flame kernel grows, the fuel gas in the sub chamber 42 is ignited and combusted. By an expansion pressure generated by the combustion of the fuel gas, a gas flow including flame is generated, and the gas including the flame is jetted from the jet port 45 to the combustion chamber. By the jet flow of flame, the fuel gas in the combustion chamber is combusted.

In the spark plug 10, since the gap 47 including the opening 48 which is open in the radial direction with respect to the sub chamber 42 extends from the sub chamber 42 to the melt portion 41, a swirling flow in the axial line direction (vertical vortex gas flow) generated in the sub chamber 42 by the combustion of the fuel gas is less likely to enter the gap 47 from the opening 48. Accordingly, gas having a temperature lower than that of the gas flow including the flame (low-temperature gas) easily remains in the gap 47, and the melt portion 41 is exposed to the low-temperature gas. Therefore, excessive heating of the melt portion 41 can be reduced. Therefore, pre-ignition, of the fuel gas having flowed from the combustion chamber through the jet port 45 into the sub chamber 42, which is caused by the melt portion 41 as a source can be reduced.

When the low-temperature gas remains in the gap 47, the fuel gas having flowed from the combustion chamber through the jet port 45 into the sub chamber 42 by a valve operation of the engine is less likely to come into contact with the melt portion 41, so that the melt portion 41 is less likely to be cooled by the fuel gas having a temperature lower than that of the low-temperature gas. After the gas flow is jetted from the jet port 45, a change in the temperature of the melt portion 41 when the fuel gas flows from the jet port 45 into the sub chamber 42 can be reduced, so that cracks that are generated in the melt portion 41 by thermal stress can be reduced.

In a cross-section including the axial line O (see FIG. 3), an angle θ between the axial line O and a straight line 50 which passes through a point indicating the first line 27 and a point indicating the second line 49 is preferably not greater than 30°. Accordingly, the step between the first surface 26 and the second surface 46 can be reduced, so that disturbance of the gas flow can be suppressed and entry of the gas flow into the gap 47 can be reduced. In the present embodiment, the second line 49 is located on the inner side in the radial direction with respect to the first line 27, but the present invention is not limited thereto. The first line 27 may be located on the inner side in the radial direction with respect to the second line 49. The angle θ is more preferably not greater than 15° and further preferably not greater than 10°.

In the case where the corner where the first surface 26 and the inner circumferential surface 24 intersect is chamfered or rounded, in the cross-section including the axial line O, the point of intersection of a straight line obtained by extending the first surface 26 and a straight line obtained by extending the inner circumferential surface 24 is defined as the point indicating the first line 27. In the case where the corner where the second surface 46 and the inner surface 43 intersect is chamfered or rounded, in the cross-section including the axial line O, the point of intersection of a straight line obtained by extending the second surface 46 and a straight line obtained by extending the inner surface 43 is defined as the point indicating the second line 49. Accordingly, the straight line 50 which passes through the point indicating the first line 27 and the point indicating the second line 49 is determined.

A line segment connecting the edges 27 and 49 of the opening 48 (a portion, of the straight line 50, cut by the edges 27 and 47) does not intersect the perpendicular line which is drawn from the midpoint of the line segment 45*b* connecting the edges 45*a*, on the inner surface 43 side of the jet port 45 (see FIG. 1 and FIG. 2). Accordingly, the fuel gas having flowed from the jet port 45 into the sub chamber 42 is further less likely to come into contact with the melt portion 41, so that a change in the temperature of the melt portion 41 can be further reduced. Therefore, cracks that are generated in the melt portion 41 by thermal stress can be further reduced.

A distance A is the shortest distance in the radial direction between an outer line located on the outer side in the radial direction (in the present embodiment, the first line 27) out of the first line 27 and the second line 49 and the outer circumferential surface 25 of a member including the outer line (in the present embodiment, the metal shell 20) out of the metal shell 20 and the cap 40. A distance B is the shortest distance between the first line 27 (outer line) and a portion 51, of the melt portion 41, which is exposed to the gap 47.

The shortest distance B and the shortest distance A preferably have a relationship of $B/A \geq 0.1$. This is because the length in the radial direction from the opening 48 of the gap 47 to the melt portion 41 can be ensured, so that the melt portion 41 is further less likely to be exposed to the gas flow including the flame. Excessive heating of the melt portion 41 can be further reduced, so that pre-ignition of the fuel gas having flowed into the sub chamber 42 can be further reduced. In addition, a path from the opening 48 to the melt portion 41 can be lengthened. Therefore, until the gas flow having entered the gap 47 from the opening 48 reaches the melt portion 41, heat is transmitted from the gas flow to the metal shell 20 and the cap 40, so that the temperature of the gas flow is decreased. Therefore, excessive heating of the melt portion 41 can be further reduced.

In the case where the corner where the first surface 26 and the inner circumferential surface 24 intersect is chamfered or rounded, in the cross-section including the axial line O, the point of intersection of the straight line obtained by extending the first surface 26 and the straight line obtained by extending the inner circumferential surface 24 is defined as the point indicating the first line 27. In the case where the corner where the second surface 46 and the inner surface 43 intersect is chamfered or rounded, in the cross-section including the axial line O, the point of intersection of the straight line obtained by extending the second surface 46 and the straight line obtained by extending the inner surface 43 is defined as the point indicating the second line 49. The shortest distances A and B are determined with the point located on the outer side in the radial direction, out of the point indicating the first line 27 and the point indicating the second line 49, as a point indicating the outer line.

The length in the radial direction (shortest distance B) of the gap 47 is longer than the dimension in the axial line direction (width) of the opening 48. Accordingly, the melt portion 41 is further less likely to be exposed to the gas flow including the flame.

A second embodiment will be described with reference to FIG. 4 and FIG. 5. In the first embodiment, the case where the inner circumferential surface 24 of the metal shell 20 on the front side with respect to the ledge portion 23 is located on the outer side in the radial direction with respect to the inner circumferential surface of the ledge portion 23, has been described. On the other hand, in the second embodiment, the case where an inner circumferential surface 61 of a metal shell 60 on the front side with respect to the ledge portion 23 and the inner circumferential surface of the ledge portion 23 are in the same plane, will be described. The same parts as those described in the first embodiment are designated by the same reference characters, and the description thereof is omitted.

Figure 4:
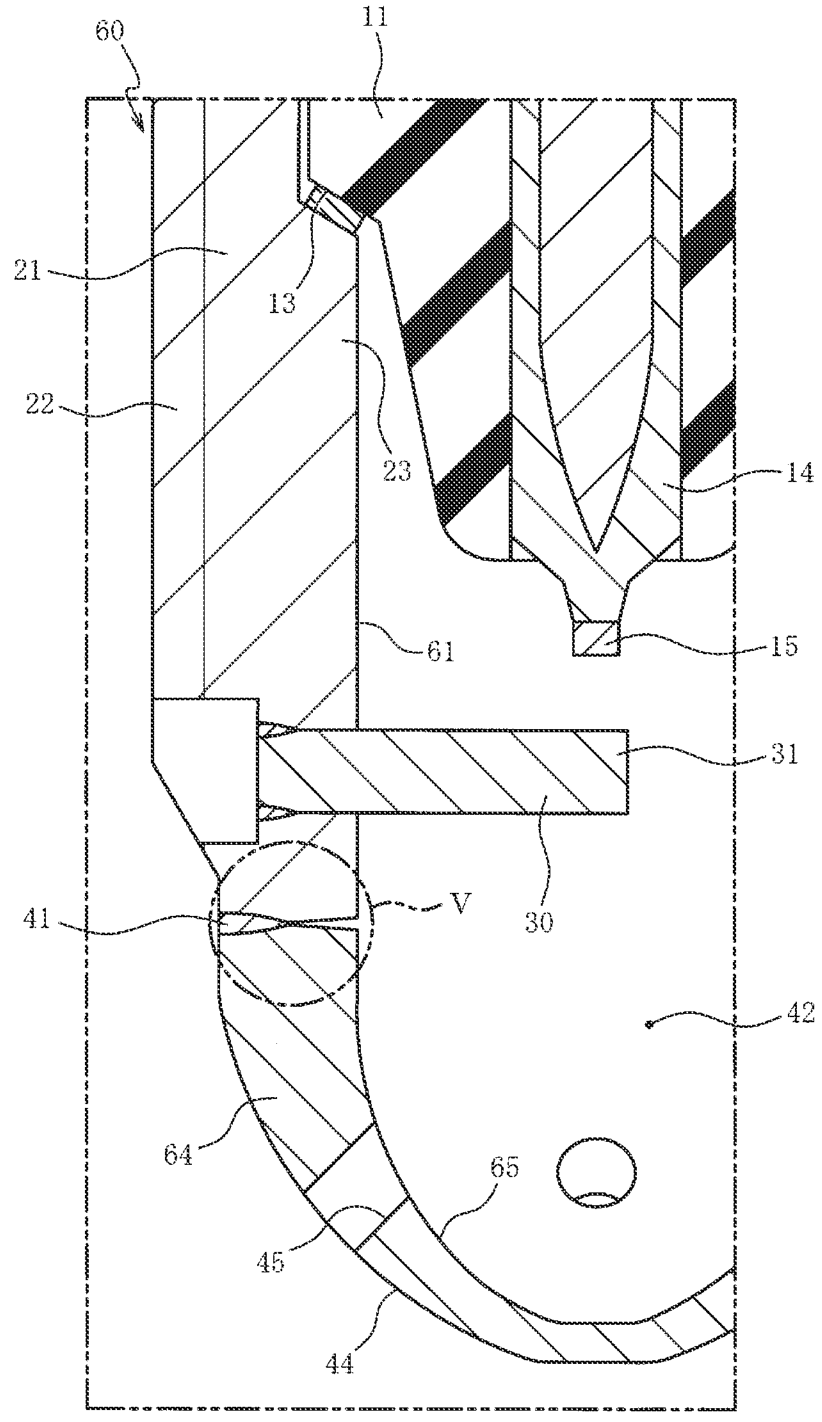
FIG. 4 is a cross-sectional view of a spark plug according to a second embodiment.

FIG. 4 is a cross-sectional view of a spark plug according to the second embodiment. FIG. 5 is an enlarged cross-sectional view, including the axial line O, of the spark plug at a part indicated by V in FIG. 4. Similar to FIG. 2, FIG. 4 is an enlarged cross-sectional view, including the axial line O, of the part indicated by II in FIG. 1. As for the metal shell 60 and a cap 64 of the second embodiment, similar to the metal shell 20 and the cap 40 of the first embodiment, the metal shell 60 holds the insulator 11, and the cap 64 is joined to the metal shell 60 via the melt portion 41.

As shown in FIG. 4, the metal shell 60 has the ledge portion 23 located on the front side of the frontward facing surface 13 of the insulator 11. In the present embodiment, the inner circumferential surface 61 of the metal shell 60 on the front side with respect to the ledge portion 23 and the inner circumferential surface of the ledge portion 23 are in the same plane. The cap 64 is joined to the metal shell 60 via the melt portion 41. The melt portion 41 is continuous over the entire circumference of the metal shell 60 and the cap 64.

Figure 5:
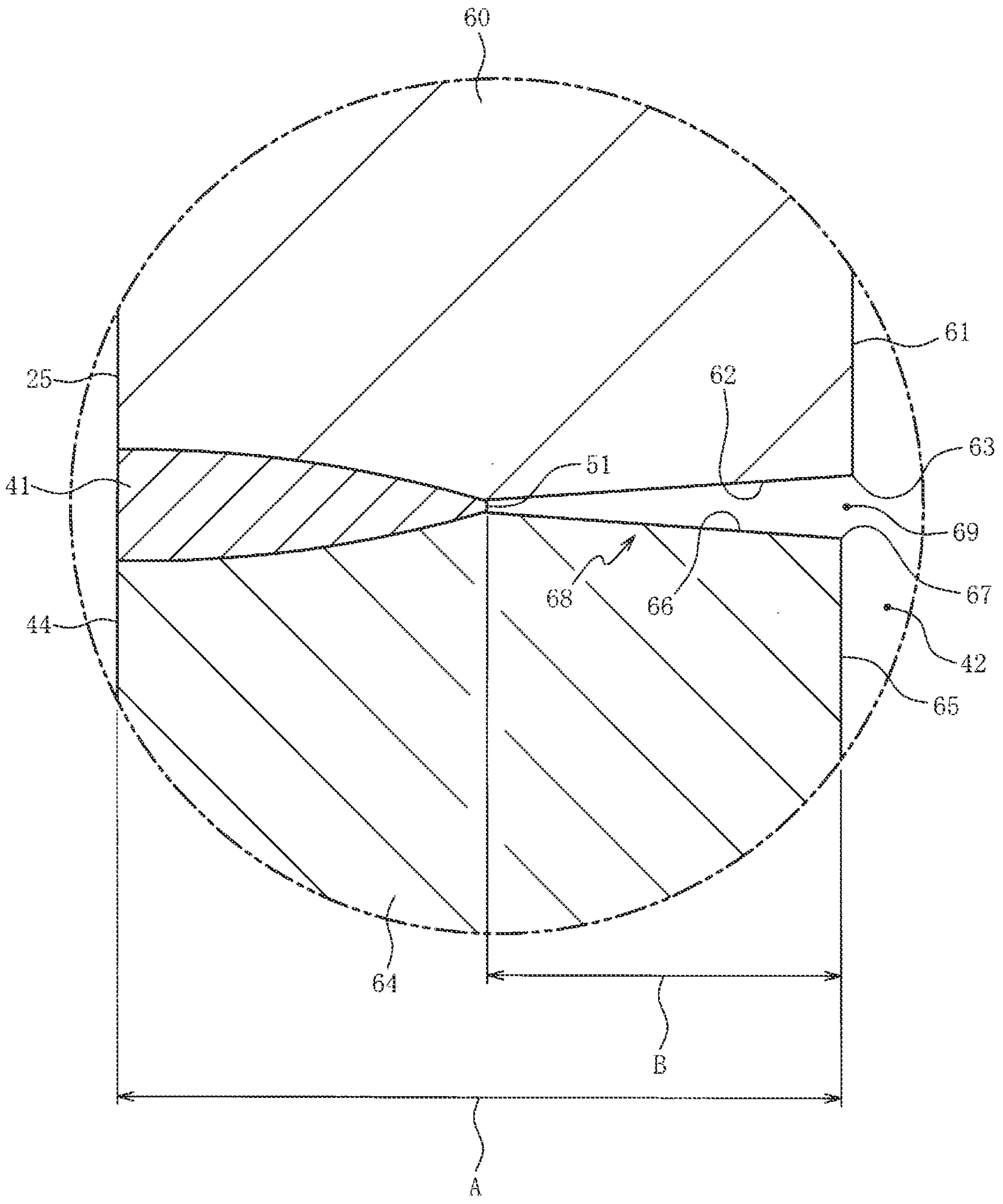
FIG. 5 is an enlarged cross-sectional view of the spark plug at a part indicated by V in FIG. 4.

As shown in FIG. 5, a gap 68 which extends from the sub chamber 42 to the melt portion 41 is present between: a first surface 62, of the metal shell 60, which connects the inner circumferential surface 61 of the metal shell 60 on the front side with respect to the ledge portion 23 (see FIG. 4) and the outer circumferential surface 25; and a second surface 66, of the cap 64, which connects an inner surface 65 and the outer surface 44 of the cap 64. The first surface 62 includes a surface which is in contact with the gap 68, and an interface between the metal shell 60 and the melt portion 41. The second surface 66 includes a surface which is in contact with the gap 68, and an interface between the cap 64 and the melt portion 41.

The gap 68 has an opening 69 which is open in the radial direction with respect to the sub chamber 42. The opening 69 is a portion, of the gap 68, between a first line 63 at which the first surface 62 and the inner circumferential surface 61 intersect and a second line 67 at which the second surface 66 and the inner surface 65 intersect. Owing to the gap 68, the melt portion 41 is less likely to be exposed to a gas flow including flame and generated in the sub chamber 42, so that excessive heating of the melt portion 41 can be reduced.

A distance A is the shortest distance in the radial direction between an outer line located on the outer side in the radial direction (in the present embodiment, the second line 67) out of the first line 63 and the second line 67 and the outer surface 44 of a member including the outer line (in the present embodiment, the cap 64) out of the metal shell 60 and the cap 64. The shortest distance A and a shortest distance B between the second line 67 (outer line) and the portion 51, of the melt portion 41, which is exposed to the gap 68 preferably have a relationship of $B/A \geq 0.1$, which is the same as in the first embodiment.

In the case where the corner where the first surface 62 and the inner circumferential surface 61 intersect is chamfered or rounded, the point of intersection of a straight line obtained by extending the first surface 62 and a straight line obtained by extending the inner circumferential surface 61 is defined as a point indicating the first line 63, and in the case where the corner where the second surface 66 and the inner surface 65 intersect is chamfered or rounded, the point of intersection of a straight line obtained by extending the second surface 66 and a straight line obtained by extending the inner surface 65 is defined as a point indicating the second line 67, which are the same as in the first embodiment.

A third embodiment will be described with reference to FIG. 6. In each of the first embodiment and the second embodiment, the case where the first surface 26 or 62 and the second surface 46 or 66 which are in contact with the gap 47 or 68 are almost flat have been described. On the other hand, in the third embodiment, the case where a first surface 71 and a second surface 74 are bent will be described. The same parts as those described in the first embodiment are designated by the same reference characters, and the description thereof is omitted.

Figure 6:
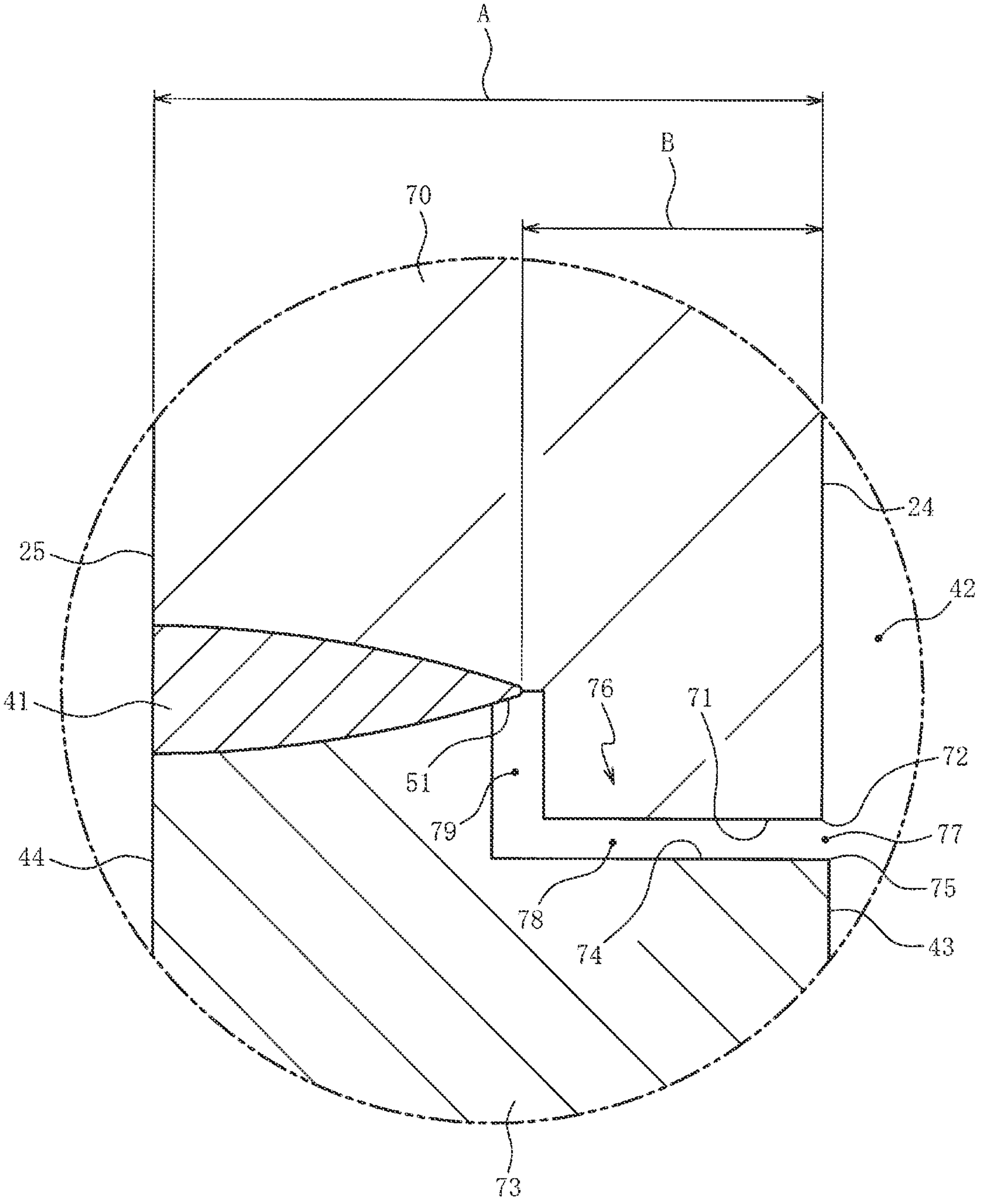
FIG. 6 is a cross-sectional view of a spark plug according to a third embodiment.

FIG. 6 is a cross-sectional view of a spark plug according to the third embodiment. Similar to FIG. 3, FIG. 6 is an enlarged cross-sectional view, including the axial line O, of the part indicated by III in FIG. 2. As for a metal shell 70 and a cap 73 of the third embodiment, similar to the metal shell 20 and the cap 40 of the first embodiment, the metal shell 70 holds the insulator 11 (see FIG. 1), and the cap 73 is joined to the metal shell 70 via the melt portion 41.

A gap 76 which extends from the sub chamber 42 to the melt portion 41 is present between: the first surface 71, of the metal shell 70, which connects the inner circumferential surface 24 of the metal shell 70 on the front side with respect to the ledge portion 23 (see FIG. 2) and the outer circumferential surface 25; and the second surface 74, of the cap 73, which connects the inner surface 43 and the outer surface 44 of the cap 73. The first surface 71 includes a surface which is in contact with the gap 76, and an interface between the metal shell 70 and the melt portion 41. The second surface 74 includes a surface which is in contact with the gap 76, and an interface between the cap 73 and the melt portion 41. The surface, of the first surface 71, which is in contact with the gap 76 extends from a first line 72 at which the first surface 71 and the inner circumferential surface 24 intersect, toward the outer side in the radial direction, and is bent to the rear side. The surface, of the second surface 74, which is in contact with the gap 76 extends from a second line 75 at which the second surface 74 and the inner surface 43 intersect, toward the outer side in the radial direction, and is bent to the rear side.

The gap 76 has an opening 77 which is open in the radial direction with respect to the sub chamber 42. The opening 77 is a portion, of the gap 76, between the first line 72 and the second line 75. The gap 76 includes a first opposing portion 78 which extends from the opening 77 toward the outer side in the radial direction, and a second opposing portion 79 which is connected to the first opposing portion 78 and extends in a direction different from the direction in which the first opposing portion 78 extends. In the present embodiment, the second opposing portion 79 extends from the first opposing portion 78 toward the rear side.

Since the gap 76 which extends from the sub chamber 42 to the melt portion 41 is present, the melt portion 41 is less likely to be exposed to a gas flow including flame and generated in the sub chamber 42. Therefore, excessive heating of the melt portion 41 can be reduced. Furthermore, since the second opposing portion 79 which extends in the direction different from the direction in which the first opposing portion 78 extends is present, the gas flow in the sub chamber is less likely to reach the melt portion 41. Excessive heating of the melt portion 41 can be further reduced, so that pre-ignition of fuel gas having flowed into the sub chamber 42 can be further reduced.

The dimension in the axial line direction (width) of the opening 77 is smaller than the dimension in the radial direction (width) of the second opposing portion 79. Accordingly, the gas flow in the sub chamber 42 is less likely to enter the opening 77. Therefore, excessive heating of the melt portion 41 can be further reduced.

Since the second opposing portion 79 extends from the first opposing portion 78 toward the rear side, the melt portion 41 can be disposed closer to the external thread 22 (see FIG. 2) than in the case where the second opposing portion 79 extends from the first opposing portion 78 toward the front side. The heat of the melt portion 41 easily moves through the external thread 22 to an engine (not shown), so that excessive heating of the melt portion 41 can be further reduced.

A distance A is the shortest distance in the radial direction between an outer line located on the outer side in the radial direction (in the present embodiment, the first line 72) out of the first line 72 and the second line 75 and the outer circumferential surface 25 of a member including the outer line (in the present embodiment, the metal shell 70) out of the metal shell 70 and the cap 73. The shortest distance A and a shortest distance B between the first line 72 (outer line) and the portion 51, of the melt portion 41, which is exposed to the gap 76 preferably have a relationship of $B/A \geq 0.1$, which is the same as in the first embodiment.

In the case where the corner where the first surface 71 which is in contact with the first opposing portion 78 and the inner circumferential surface 24 intersect is chamfered or rounded, the point of intersection of a straight line obtained by extending the first surface 71 and a straight line obtained by extending the inner circumferential surface 24 is defined as a point indicating the first line 72, and in the case where the corner where the second surface 74 which is in contact with the first opposing portion 78 and the inner surface 43 intersect is chamfered or rounded, the point of intersection of a straight line obtained by extending the second surface 74 and a straight line obtained by extending the inner surface 43 is defined as a point indicating the second line 75, which are the same as in the first embodiment.

A fourth embodiment will be described with reference to FIG. 7. In the third embodiment, the case where the first surface 71 and the second surface 74 are bent in the same direction has been described. On the other hand, in the fourth embodiment, the case where a first surface 81 and a second surface 84 are bent in different directions will be described. The same parts as those described in the first embodiment are designated by the same reference characters, and the description thereof is omitted.

Figure 7:
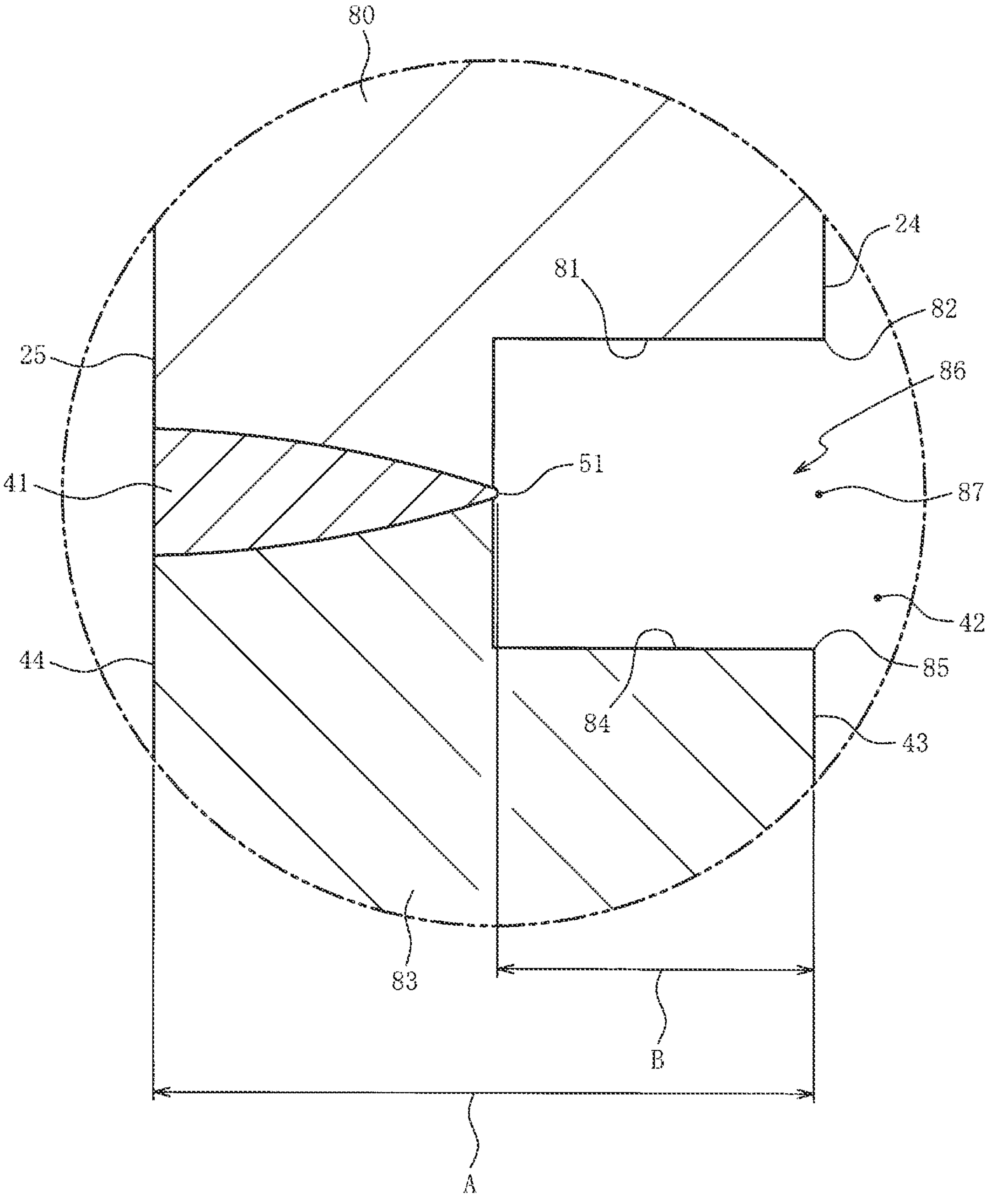
FIG. 7 is a cross-sectional view of a spark plug according to a fourth embodiment.

FIG. 7 is a cross-sectional view of a spark plug according to the fourth embodiment. Similar to FIG. 3, FIG. 7 is an enlarged cross-sectional view, including the axial line O, of the part indicated by III in FIG. 2. As for a metal shell 80 and a cap 83 of the fourth embodiment, similar to the metal shell 20 and the cap 40 of the first embodiment, the metal shell 80 holds the insulator 11 (see FIG. 1), and the cap 83 is joined to the metal shell 80 via the melt portion 41.

A gap 86 which extends from the sub chamber 42 to the melt portion 41 is present between: the first surface 81, of the metal shell 80, which connects the inner circumferential surface 24 of the metal shell 80 on the front side with respect to the ledge portion 23 (see FIG. 2) and the outer circumferential surface 25; and the second surface 84, of the cap 83, which connects the inner surface 43 and the outer surface 44 of the cap 83.

The first surface 81 includes a surface which is in contact with the gap 86, and an interface between the metal shell 80 and the melt portion 41. The second surface 84 includes a surface which is in contact with the gap 86, and an interface between the cap 83 and the melt portion 41. The surface, of the first surface 81, which is in contact with the gap 86 extends from a first line 82 at which the first surface 81 and the inner circumferential surface 24 intersect, toward the outer side in the radial direction, and is bent to the front side. The surface, of the second surface 84, which is in contact with the gap 86 extends from a second line 85 at which the second surface 84 and the inner surface 43 intersect, toward the outer side in the radial direction, and is bent to the rear side.

The gap 86 has an opening 87 which is open in the radial direction with respect to the sub chamber 42. The opening 87 is a portion, of the gap 86, between the first line 82 and the second line 85. Since the gap 86 which extends from the sub chamber 42 to the melt portion 41 is present, the melt portion 41 is less likely to be exposed to a gas flow including flame and generated in the sub chamber 42. Therefore, excessive heating of the melt portion 41 can be reduced.

A distance A is the shortest distance in the radial direction between an outer line located on the outer side in the radial direction (in the present embodiment, the second line 85) out of the first line 82 and the second line 85 and the outer surface 44 of a member including the outer line (in the present embodiment, the cap 83) out of the metal shell 80 and the cap 83. The shortest distance A and a shortest distance B between the second line 85 (outer line) and the portion 51, of the melt portion 41, which is exposed to the gap 86 preferably have a relationship of $B/A \geq 0.1$, which is the same as in the first embodiment.

In the case where the corner where the first surface 81 and the inner circumferential surface 24 intersect is chamfered or rounded, the point of intersection of a straight line obtained by extending the first surface 81 and a straight line obtained by extending the inner circumferential surface 24 is defined as a point indicating the first line 82, and in the case where the corner where the second surface 84 and the inner surface 43 intersect is chamfered or rounded, the point of intersection of a straight line obtained by extending the second surface 84 and a straight line obtained by extending the inner surface 43 is defined as a point indicating the second line 85, which are the same as in the first embodiment.

A fifth embodiment will be described with reference to FIG. 8. In each of the first embodiment to the fourth embodiment, the case where the melt portion 41 is provided between the metal shell and the cap by butt welding has been described. On the other hand, in the fifth embodiment, the case where the melt portion 41 is provided between a metal shell 90 and a cap 93 by lap welding will be described. The same parts as those described in the first embodiment are designated by the same reference characters, and the description thereof is omitted.

Figure 8:
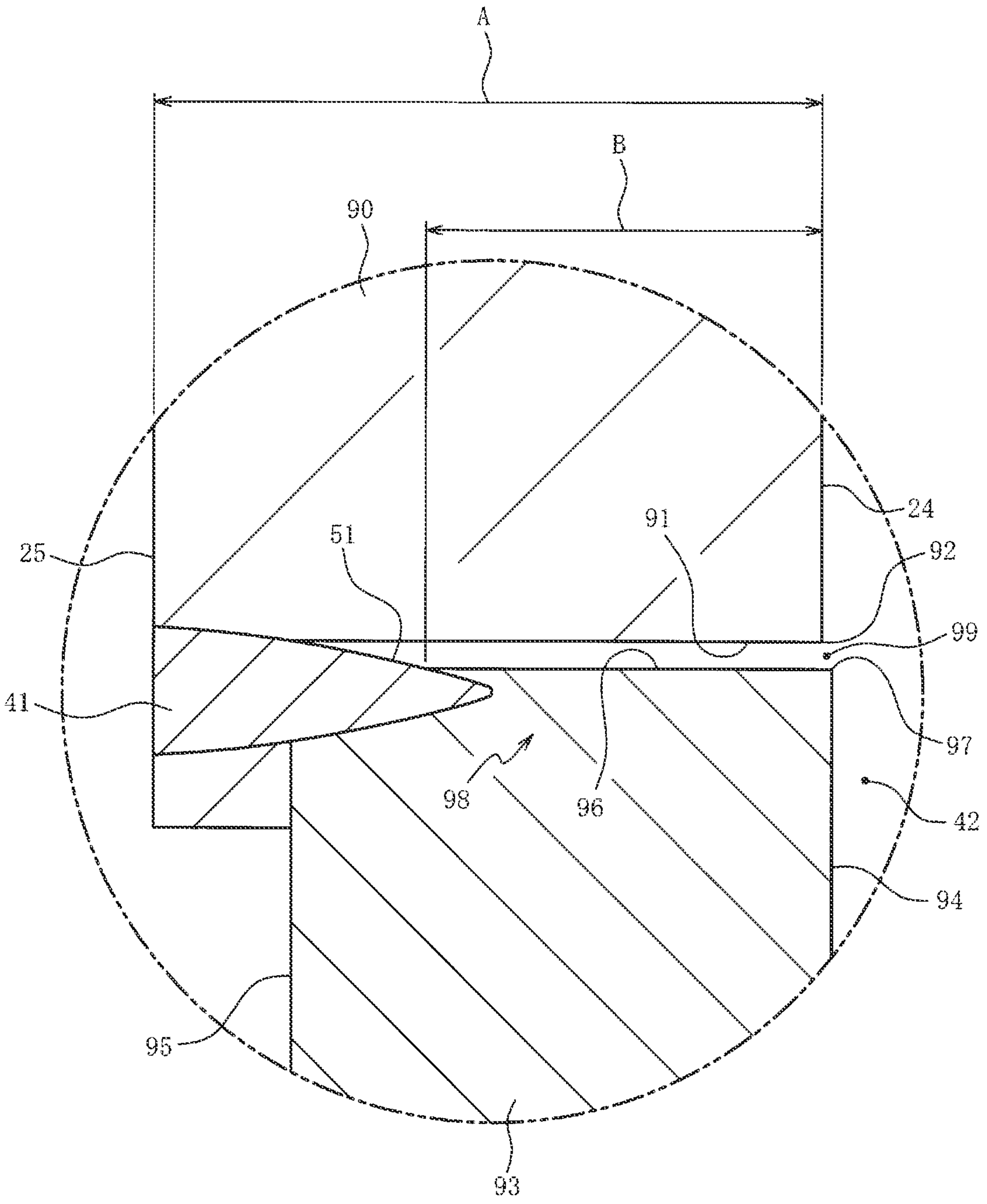
FIG. 8 is a cross-sectional view of a spark plug according to a fifth embodiment.

FIG. 8 is a cross-sectional view of a spark plug according to the fifth embodiment. Similar to FIG. 3, FIG. 8 is an enlarged cross-sectional view, including the axial line O, of the part indicated by III in FIG. 2. As for the metal shell 90 and the cap 93 of the fifth embodiment, similar to the metal shell 20 and the cap 40 of the first embodiment, the metal shell 90 holds the insulator 11 (see FIG. 1), and the cap 93 is joined to the metal shell 90 via the melt portion 41. The cap 93 is disposed inside a part of the metal shell 90.

A gap 98 which extends from the sub chamber 42 to the melt portion 41 is present between: a first surface 91, of the metal shell 90, which connects the inner circumferential surface 24 of the metal shell 90 on the front side with respect to the ledge portion 23 (see FIG. 2) and the outer circumferential surface 25; and a second surface 96, of the cap 93, which connects an inner surface 94 and an outer surface 95 of the cap 93. The first surface 91 includes a surface which in contact with the gap 98, and an interface between the metal shell 90 and the melt portion 41. The second surface 96 includes a surface which in contact with the gap 98, and an interface between the cap 93 and the melt portion 41. The interface between the cap 93 and the melt portion 41 connects the outer surface 95 of the cap 93 and the surface, of the second surface 96, which is in contact with the gap 98.

The gap 98 has an opening 99 which is open in the radial direction with respect to the sub chamber 42. The opening 99 is a portion, of the gap 98, between a first line 92 at which the first surface 91 and the inner circumferential surface 24 intersect and a second line 97 at which the second surface 96 and the inner surface 94 intersect. Since the gap 98 which extends from the sub chamber 42 to the melt portion 41 is present, the melt portion 41 is less likely to be exposed to a gas flow including flame and generated in the sub chamber 42. Therefore, excessive heating of the melt portion 41 can be reduced.

A distance A is the shortest distance in the radial direction between an outer line located on the outer side in the radial direction (in the present embodiment, the first line 92) out of the first line 92 and the second line 97 and the outer circumferential surface 25 of a member including the outer line (in the present embodiment, the metal shell 90) out of the metal shell 90 and the cap 93. The shortest distance A and a shortest distance B between the first line 92 (outer line) and the portion 51, of the melt portion 41, which is exposed to the gap 98 preferably have a relationship of $B/A \geq 0.1$, which is the same as in the first embodiment.

In the case where the corner where the first surface 91 and the inner circumferential surface 24 intersect is chamfered or rounded, the point of intersection of a straight line obtained by extending the first surface 91 and a straight line obtained by extending the inner circumferential surface 24 is defined as a point indicating the first line 92, and in the case where the corner where the second surface 96 and the inner surface 94 intersect is chamfered or rounded, the point of intersection of a straight line obtained by extending the second surface 96 and a straight line obtained by extending the inner surface 94 is defined as a point indicating the second line 97, which are the same as in the first embodiment.

While the present invention has been described above based on the above embodiments, the present invention is not limited to the above embodiments at all. It can be easily understood that various modifications can be made without departing from the spirit of the present invention.

In each of the embodiments, the case where the hemispherical cap 40, 64, 73, 83, or 93 having the spherical crown-shaped inner surface 43 or 65 and outer surface 44 is joined to the metal shell 20, 60, 70, 80, or 90 has been described, but the present invention is not necessarily limited thereto. The shape of the cap can be set as appropriate. For example, it is naturally possible to use a bottomed cylindrical cap or a disc-shaped cap.

In each of the embodiments, the case where the linear ground electrode 30 is joined at the position of the external thread 22 of the metal shell 20 or 60 has been described, but the present invention is not necessarily limited thereto. The ground electrode 30 may be joined to the metal shell 20 or 60 or may be joined to the cap 40, 64, 73, 83, or 93. The ground electrode 30 is not limited to one having a linear shape. The ground electrode 30 may be bent. The position at which the spark gap 32 is provided is not limited to the front side of the front end portion 15 of the center electrode 14. The spark gap 32 may be provided on the outer side in the radial direction of the front end portion 15 of the center electrode 14.

In the third embodiment, the case where the second opposing portion 79 is located on the rear side with respect to the first opposing portion 78 has been described, but the present invention is not necessarily limited thereto. It is naturally possible to set the shape of the gap 76 such that the second opposing portion 79 is located on the front side with respect to the first opposing portion 78.

In the fourth embodiment, the case where both the first surface 81 and the second surface 84 are bent has been described, but the present invention is not necessarily limited thereto. It is naturally possible to make either the first surface 81 or the second surface 84 flat.

In the fifth embodiment, the case where the melt portion 41 is provided by lap welding in a state where the cap 93 overlaps the inner side of the metal shell 90 has been described, but the present invention is not necessarily limited thereto. On the contrary, it is naturally possible to provide the melt portion 41 by lap welding in a state where the metal shell 90 overlaps the inner side of the cap 93.

DESCRIPTION OF REFERENCE NUMERALS

10 spark plug
11 insulator
12 axial hole
13 frontward facing surface
14 center electrode
15 front end portion
20, 60, 70, 80, 90 metal shell
23 ledge portion
24, 61 inner circumferential surface
25 outer circumferential surface
26, 62, 71, 81, 91 first surface
27, 72, 92 first line (outer line, edge of opening)
30 ground electrode
31 end portion
32 spark gap
40, 64, 73, 83, 93 cap
41 melt portion
42 sub chamber
43, 65, 94 inner surface
44, 95 outer surface
45 jet port
**45*a*** jet port connecting edge

45*b* line segment
45*c* perpendicular line
46, 66, 74, 84, 96 second surface
47, 68, 76, 86, 98 gap
48, 69, 77, 87, 99 opening
49, 75, 97 second line
51 portion which is expose to gap
63,82 first line (edge of opening)
67,85 second line (outer line, edge of opening)
78 first opposing portion
79 second opposing portion

What is claimed is:

1. A spark plug comprising:

a tubular insulator having a frontward facing surface on an outer circumference thereof, and having an axial hole extending along an axial line;

a center electrode disposed in the axial hole of the insulator;

a tubular metal shell having, on an inner circumference thereof, a ledge portion engaging with the frontward facing surface of the insulator;

a ground electrode electrically connected to the metal shell and providing a spark gap between a front end portion of the center electrode and an end portion thereof; and a cap joined to the metal shell via a melt portion, wherein the cap covers the front end portion of the center electrode and the end portion of the ground electrode from a front side to form a sub chamber, and has a jet port penetrating from an inner surface to an outer surface thereof, a gap which extends from the sub chamber to the melt portion is present between a first surface which connects an inner circumferential surface of the metal shell on the front side with respect to the ledge portion and an outer circumferential surface of the metal shell and a second surface, of the cap, which connects the inner surface and the outer surface, and the gap has an opening which is open in a radial direction with respect to the sub chamber.

2. The spark plug according to claim 1, wherein the gap has a first opposing portion at which the first surface and the second surface oppose each other such that the first opposing portion extends from the opening toward an outer side in the radial direction, and a second opposing portion which is connected to the first opposing portion and extends in a direction different from a direction in which the first opposing portion extends.

3. The spark plug according to claim 1, wherein a shortest distance A in the radial direction between an outer line located on the outer side in the radial direction out of a first line at which the inner circumferential surface of the metal shell and the first surface intersect and a second line at which the inner surface and the second surface of the cap intersect and the outer surface or the outer circumferential surface on the front side with respect to the ledge portion, and a shortest distance B in the radial direction between the outer line and a portion, of the melt portion, which is exposed to the gap have a relationship of $B/A \geq 0.1$.

4. The spark plug according to claim 1, wherein, in a cross-section including the axial line, a perpendicular line which is drawn from a midpoint of a line segment connecting edges on the inner surface side of the jet port does not intersect a line segment connecting edges of the opening.

* * * * *